United States Patent [19]

Mair

[11] 4,381,743
[45] May 3, 1983

[54] VARIABLE AREA SWIRL GENERATING ENGINE CYLINDER INLET PORT

[75] Inventor: Alex C. Mair, Bloomfield Hills, Mich.

[73] Assignee: General Motors Corporation, Detroit, Mich.

[21] Appl. No.: 238,492

[22] Filed: Feb. 26, 1981

[51] Int. Cl.³ .............................................. F01L 3/00
[52] U.S. Cl. ................................ 123/188 M; 123/306
[58] Field of Search ........................... 123/188 M, 306

[56] References Cited

U.S. PATENT DOCUMENTS

| | | | |
|---|---|---|---|
| 4,015,577 | 4/1977 | Elsbett et al. | 123/188 M |
| 4,180,041 | 12/1979 | Miyazaki | 123/188 M |
| 4,207,854 | 6/1980 | Alford et al. | 123/188 M |
| 4,320,725 | 3/1982 | Rychlik et al. | 123/188 M |

FOREIGN PATENT DOCUMENTS 2308327  10/1973  Fed. Rep. of Germany ... 123/188 M

Primary Examiner—Craig R. Feinberg
Assistant Examiner—W. R. Wolfe
Attorney, Agent, or Firm—Robert J. Outland

[57] ABSTRACT

Control of cylinder swirl in an internal combustion engine is provided by a swirl generating inlet port having a movable wall to vary the cross-sectional area of the port in a swirl portion surrounding the valve axis. In a preferred embodiment, a wall of thin flexible spring material extends the length of the port and is tensioned or released to vary the flow area.

3 Claims, 5 Drawing Figures

VARIABLE AREA SWIRL GENERATING ENGINE CYLINDER INLET PORT

TECHNICAL FIELD

This invention relates to internal combustion engine intake systems and more particularly to variable area swirl generating cylinder inlet ports for such engines.

BACKGROUND

It is well known in the art relating to diesel engines to use swirl producing cylinder inlet ports to aid the creation of combustion chamber turbulence for improved mixing and combustion of the injected fuel charge. Recently, increased emphasis has been placed on the use of such swirl producing inlet ports in spark-ignition internal combustion engines to provide increased combustion rates with reduced ignition delay and improved cyclic stability. Such changes have been particularly desirable to offset the effects of reduced compression ratios, retarded spark timing and the use of exhaust gas recirculation as means to control regulated emissions in the exhaust gases.

SUMMARY OF THE INVENTION

The present invention proposes to increase the effectiveness of swirl generating inlet ports for internal combustion engines, and especially for spark-ignition internal combustion engines of the type having a throttled intake that provides for a variation in inlet air flow between closed throttle and wide open throttle conditions. This is accomplished by providing movable wall means in the swirl inlet port for each cylinder. Such movable wall means are arranged to vary the cross-sectional area of the inlet flow path over a major portion of the port length so as to maintain a more constant flow rate of the inlet charge under varying conditions from closed to wide open throttle engine operation. As a result, the advantages of cylinder swirl may be obtained more completely in the part throttle cruising and lower power conditions of engine operation, which represent a large portion of vehicle operation. At the same time, efficient operation with desirable amounts of cylinder swirl under more wide open throttle conditions is also provided for.

It is recognized that numerous possibilities exist for providing movable wall devices in swirl generating inlet ports formed in accordance with the broader aspects of the invention. A preferred embodiment of the concept chosen for purposes of illustration, utilizes a swirl port shape of the general character disclosed in the copending U.S. patent application Ser. No. 232,675 filed Feb. 9, 1981 and assigned to the assignee of the present invention. To this general port configuration, there is added a modified entrance portion and a flexible guide wall member. The latter is attached to the port wall at the outlet end and extends around the valve axis and out the port entrance portion. The guide wall member is made of a spring material which inherently urges the member into a port area reducing configuration, the area of which is increased by applying a tension force on the extending end of the guide wall member that resiliently deforms it into a position along the inner wall of the port.

These and other features and advantages of the invention will be more fully understood from the following description of a preferred embodiment taken together with the accompanying drawing.

DESCRIPTION OF THE ILLUSTRATED EMBODIMENT

Figure 1:
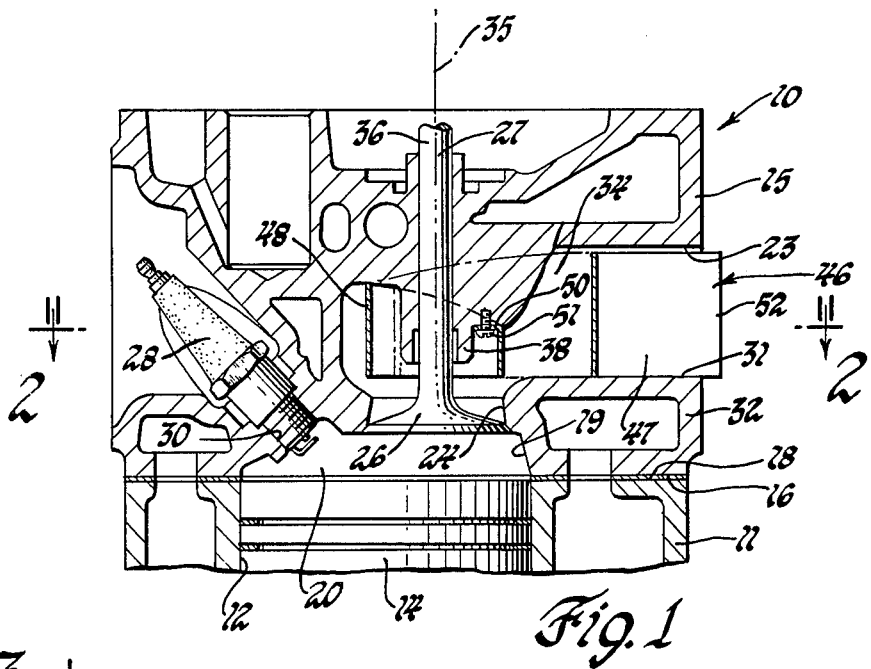
FIG. 1 is a transverse cross-sectional view generally in the plane of the line 1—1 of FIG. 2 at one of the inlet ports through the cylinder head and upper cylinder portion of an engine formed in accordance with the invention.

Referring now in detail to FIGS. 1 through 4 of the drawings, numeral 10 generally indicates an internal combustion engine of the spark ignition type. Engine 10 includes a cylinder block 11 defining a cylinder 12 in which there is reciprocably disposed a piston 14. A cylinder head 15 is provided have a lower surface 16 seated on an upper surface 18 of the cylinder block to close the ends of the cylinders 12.

The bottom side of the cylinder head is provided with a plurality of combustion chamber recesses 19 which are aligned one with each of the cylinders in the cylinder block and cooperate with the pistons to form enclosed combustion chambers 20. For each of the cylinders, the cylinder head is provided with an exhaust port, not shown, opening to its respective combustion chamber to receive exhaust gases therefrom and capable of being closed by an exhaust valve, not shown, in conventional fashion.

A swirl generating inlet port 23 formed in accordance with the invention is also provided in the cylinder head for each of the engine cylinders. Each inlet port 23 opens to its respective combustion chamber recess 19 at an outlet opening throat portion 24 adapted to be closed by the head 26 of an inlet valve 27. The exhaust and inlet port openings are located adjacent one another in the combustion chamber recesses. A spark plug 28 is located to one side of and between the two port openings at one side of each combustion chamber recess, a suitable threaded opening 30 being provided for the purpose of receiving the spark plug.

Each inlet port 23 includes the previously mentioned throat portion 24 of generally circular cross-section which constitutes the outlet opening of the port into the engine cylinder or combustion chamber. An entrance portion 31 of the port is spaced upstream from the throat portion and opens through a side wall 32 of the cylinder head, which is adapted to support an intake manifold, not shown, to supply air-fuel mixture to all the inlet ports of the cylinder head.

Between the distal entrance and throat portions, the port includes a fluid flow passage 34 extending downstream from the entrance portion 31 to one side of and around the axis 35 on which the stem 36 of the inlet valve 27 is reciprocably supported. Passage 34 blends into the throat portion in a spiral configuration 37 of decreasing radius about the valve axis. A valve guide boss 38, surrounding the valve axis and supporting the valve stem, terminates in the flow passage well into the lower portion of the passage but substantially upstream of the throat portion, thus providing in addition to support for the valve, a central pillar around which portions of the incoming air flow are caused to swirl.

The port 23 further includes an inside wall 39 which extends from the entrance portion, preferably in a straight or convexly curved configuration, to a tangential intersection with the outer surface of the guide boss at a point 40 laterally adjacent the valve axis. An outside wall 42 extends from the entrance portion in generally parallel relationship to the inside wall to a point 43 approximately opposite the point of tangential intersection 40 of the inside wall with the guide boss, from which point 43 the outside wall curves around the valve axis and the guide boss in a spiral of decreasing radius. This radius reaches a minimum only slightly larger than the radius of the port throat at or before the port terminus 44, where the outside wall has curved around to an intersection with the side of the inside wall 39 for the port.

Figure 2:
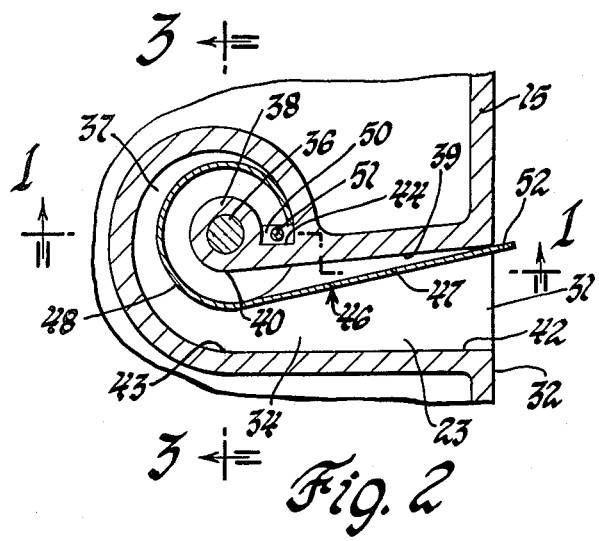
FIG. 2 is a cross-sectional view through the inlet port taken generally in the plane indicated by the line 2—2 of FIG. 1 in which the movable guide wall of the port is shown in its relaxed, port-restricting condition.

In accordance with the invention, each of the inlet ports 23 is additionally provided with a flexible guide wall member 46. The guide wall is preferably formed as a thin flexible spring member from spring steel or other suitable material, such as a resilient plastic. Member 46 in its relaxed or untensioned condition, as shown in FIG. 2, has a straight entrance portion 47 that extends from the outer edge of the port inner wall through the port entrance portion to a point between the port walls and approximately aligned with the edge of port throat at a location laterally opposite the inlet valve axis, between points 40 and 43 of the port walls. Here the straight entrance portion 47 joins a curved swirl portion 48 which turns in approximately cylindrical fashion about the inlet valve axis, extending to the port terminus at 44. At this point, a tab 50 is provided which is secured to the roof of the port by a screw 51 or other suitable fastening means.

A preferred characteristic of inlet ports, in accordance with the invention, is that the cross-sectional area of the port entrance portion 31 to the point of intersection 40 of the inside wall with the guide boss is preferably constant or decreases slightly at a relatively uniform rate. In the spiral portion 37 of the port, the cross-sectional area preferably decreases at a substantially uniform rate from a relatively large area at the point of tangential intersection 40 to a much smaller area of 5 to 15 percent of the entrance area at the end of the port, adjacent the inside wall. The spiral configuration, which is preferably logarithmic, may be terminated short of the inside wall if desired.

The height of the port may be constant or reducing in whole or in part, in the direction of flow from the entrance to the end of the port. Preferably any variation in the port height is as smooth as possible. The height of the guide wall member 46 will preferably be essentially the same as the height of that portion of the port in which each respective portion of the guide wall member is located. However, in order to provide the desired movement of the guide wall member, as will be subsequently described, it may be necessary to make some portions of the member 46 of slightly lesser height than the corresponding portion of the port in which such portion is located.

Figure 3:
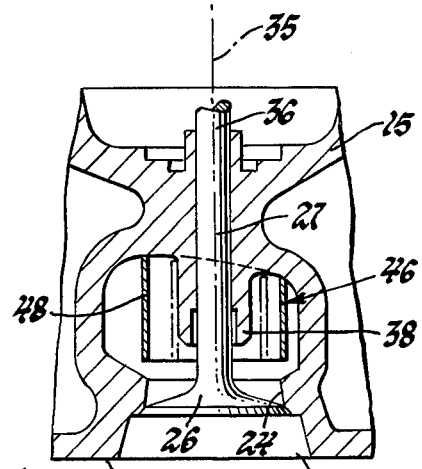
FIG. 3 is a cross-sectional view through the port taken generally in the plane indicated by the line 3—3 of FIG. 2.

FIGS. 1–3 of the drawing show the guide wall member 46 of the port in its relaxed position, wherein the effective area of the entrance and swirl portions of the ports is reduced to that portion of the area located between the guide wall member 46 and the outside wall 42 of the port. This is the position of the guide wall member which is preferred for low speed and load operation of the engine to maximize the rate of flow of inlet gas through the port and thereby maximize the swirl producing effect of the port.

Figure 4:
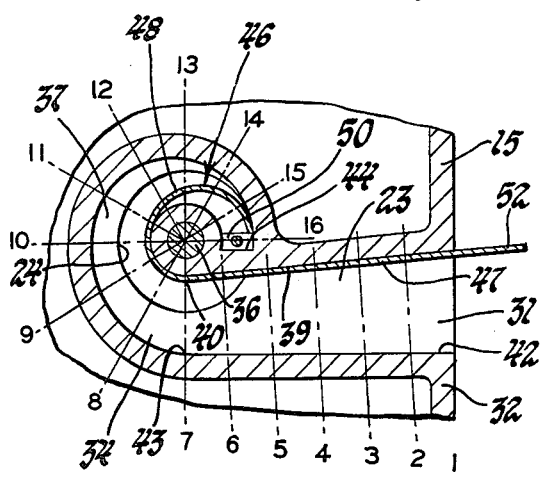
FIG. 4 is a cross-sectional view similar to FIG. 2 but showing the movable port guide wall in its stretched, open port configuration and including a plurality of numbered section lines for the port.

In order to accommodate flow at increased engine speeds and loads, wherein the throttle, not shown, would be opened more fully toward a wide open throttle condition, the flexible guide wall member is deformed by pulling on the extending outer end 52 by means of a suitable control device, not shown, so as to deform the guide wall member 48 by forcing it into a position closer to the inside wall 39. Such a controlling movement is shown in FIG. 4 in the ultimate position, reached at the wide open throttle condition, wherein the guide wall member 46 has been forced into engagement with the inside wall of the port along the complete entrance portion as well as for a substantial distance around the guide boss. In this condition, the full volume of the inlet port is open to inlet flow without any substantial restriction except, possibly, near the terminus of the port. If desired, the arrangement and location of the guide wall member at the port terminus could be modified to provide for a greater flow area at this location.

Figure 5:
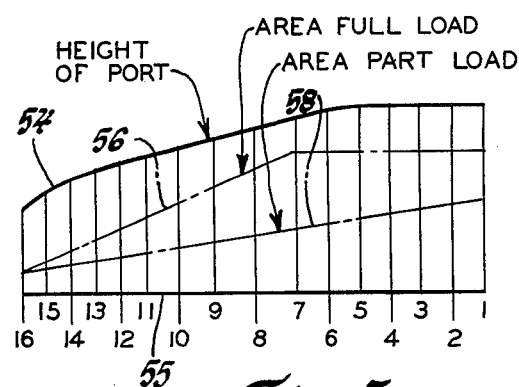
FIG. 5 is a horizontal projection of the port outside wall surface showing the corresponding values of cross-sectional area and height at each numbered position indicated in FIG. 4 along the length of the port.

It will be noted that, in FIG. 4, the length of the outside port wall 42 is divided into a series of elements by the guide lines 1–16. FIG. 5 is a graphical projection of the length of the outside port wall showing the sixteen divisions of FIG. 4. In this figure, the distance of the solid line 54 above the base line 55 graphically represents the height of the port at the various locations. The dashed line 56 represents the full load area of the port at the various locations when the guide wall member 46 is in the position shown in FIG. 4, whereas the dashed line 58 represents the part load area of the port when the guide wall member 46 is in its relaxed condition as shown in FIG. 2. Obviously, the area of the port may be varied between the areas indicated by lines 56 and 58 to accommodate various conditions of engine operation by varying the movement of the outer end 52 of the guide wall member to obtain positions intermediate those shown in FIGS. 2 and 4.

While the invention has been described by reference to a preferred embodiment chosen for purposes of illustration, it should be understood that numerous modifications could be made in the manner of providing for adjustment of the swirl port area under varying engine speed and load conditions to thus provide for maintenance of desirable swirl conditions under the varying operating circumstances of a vehicle engine. Accordingly, it is intended that the invention not be limited to the specific embodiment described but that it have the full scope permitted by the language of the following claims.

The embodiments of the invention in which an exclusive property or privilege is claimed are defined as follows:

1. A variable area, swirl generating, intake system for an internal combustion engine having a cylinder closed at one end, means defining an inlet port through the cylinder closed end and communicating with the cylinder, and a poppet inlet valve having a central axis and reciprocably disposed in the port for controlling communication of the inlet port with the cylinder, said inlet port being characterized by a throat portion of generally circular cross-section opening into the cylinder and adapted to be closed by the inlet valve, an entrance portion spaced upstream from the throad portion, a fluid flow path extending from the entrance portion to one side of and around the valve axis, blending into the throat portion in a descending spiral about the valve axis, and a movable wall in said port and extending along a major portion of said spiral, said movable wall being adjustable intermediate its ends between a first position of open area in said spiral portion and a second position of reduced area in said spiral portion, whereby the cross-sectional area of said portion of the inlet port spiral is variable to vary as desired the rate of flow and the level of mixture swirl created in the cylinder.

2. A variable area, swirl generating, intake system for an internal combustion engine having a cylinder closed at one end, means defining an inlet port through the cylinder closed end and communicating with the cylinder, and a poppet inlet valve having a central axis and reciprocably disposed in the port for controlling communication of the inlet port with the cylinder, said inlet port being characterized by a throat portion of generally circular cross-section opening into the cylinder and adapted to be closed by the inlet valve, an entrance portion spaced upstream from the throat portion, a fluid flow path extending from the entrance portion to one side of and around the valve axis, blending into the throat portion in a descending spiral about the valve axis, and a movable wall in said port and extending at least part way from the entrance portion through a major portion of the spiral toward its distal end, said movable wall being adjustable intermediate its ends between a first position of open area and a second position of reduced area through adjacent portions of the partially spiral flow path, whereby the cross-sectional area of the inlet port is variable to vary as desired the rate of flow and the level of mixture swirl created in the cylinder.

3. A variable area, swirl generating, intake system for an internal combustion engine having a cylinder closed at one end, means defining an inlet port through the cylinder closed end and communicating with the cylinder, and a poppet inlet valve having a central axis and reciprocably disposed in the port for controlling communication of the inlet port with the cylinder, said inlet port being characterized by a throat portion of generally circular cross-section opening into the cylinder and adapted to be closed by the inlet valve, an entrance portion spaced upstream from the throat portion, a fluid flow path extending from the entrance portion to one side of and around the valve axis, blending into the throat portion in a descending spiral about the valve axis, wherein said fluid flow path is defined by a valve guide boss surrounding the valve axis and terminating in the flow path substantially upstream of the throat portion, an inside wall extending from the entrance portion to tangentially intersect the guide boss at a point adjacent the valve axis, an outside wall curving around the guide boss from about opposite said point of intersection to an end of the spiral near said inside wall, and a movable wall in said port and extending from the entrance portion to adjacent said end of the spiral, said movable wall being adjustable intermediate its ends between a first position of open area lying closely along said inside wall from said entrance portion through at least part of said spiral, and a second position of reduced area lying intermediate the inside and outside walls through major portions of the flow path including the spiral, whereby the cross-sectional area of the inlet port is variable intermediate its ends to vary as desired the rate of flow and the level of mixture swirl created in the cylinder.

* * * * *